June 20, 1950 R. H. STEINBERG ET AL 2,512,045
PUMPING SYSTEM FOR MILK PROCESSORS
Filed April 23, 1946

INVENTORS
Ralph H. Steinberg
Harry Cohen

Patented June 20, 1950

2,512,045

UNITED STATES PATENT OFFICE 2,512,045

PUMPING SYSTEM FOR MILK PROCESSORS

Ralph H. Steinberg and Harry Cohen, Chicago, Ill.; said Cohen assignor to said Steinberg Application April 23, 1946, Serial No. 664,406

1 Claim. (Cl. 257—2)

This invention relates to the use and control of an auxiliary pump along with the main pump in a pumping system which includes a milk to milk heat regenerator with both sides closed to the atmosphere as employed in the dairy industry in pasteurization, homogenization, etc. This milk to milk heat regenerator is a heat exchange apparatus in which cold raw milk or other liquid milk product is preheated by the hot pasteurized milk or liquid milk product, and likewise the hot pasteurized milk or liquid milk product is of course cooled by the cold raw milk or liquid milk product.

A milk to milk heat regenerator with both sides closed to the atmosphere consists in the simplest case of a plate or series of plates on one side of which flows hot pasteurized milk, and on the other side of which flows cold raw milk. The purpose of the regenerator is to preheat the cold raw product and precool the hot pasteurized product. This system saves part of the cost of heating and also part of the cost of cooling in the process of pasteurization of a liquid dairy product. It is necessary that the lowest pressure on the pasteurized side of the regenerator shall be higher than the highest pressure on the raw side of the regenerator in order to prevent contamination by leakage of the raw milk into the pasteurized milk. In order to accomplish this, the regular system consists of a raw milk tank, a milk to milk regenerator, a pump, and a pasteurizing unit. The flow of the milk is as follows, the raw milk is sucked from the raw milk tank through the raw side of the milk to milk regenerator to the inlet side of the pump; then it is pumped by positive pressure through the pasteurizer 4 and thence back to the pasteurized side of the milk to milk regenerator and then through the final cooler to the bottling unit, pasteurized storage tank, homogenizer, etc. In some systems the pump and homogenizer are an integral unit. It is thus seen that the milk between the pump and the raw milk supply is always under subatmospheric pressure since it is being sucked by the pump. Thus whenever leaks occur in this part of the system, and they do occur often, air is sucked into the system and later causes much difficulty in bottling, etc. It is the purpose of our invention to reduce or eliminate this sucking of air into the system by our pressure-differential controlled auxiliary pumping system. The terminology milk to milk heat regenerator should not be understood to exclude the use in the apparatus of other liquid dairy products such as cream, skimmed milk, chocolate drinks, etc.

Figure 1:
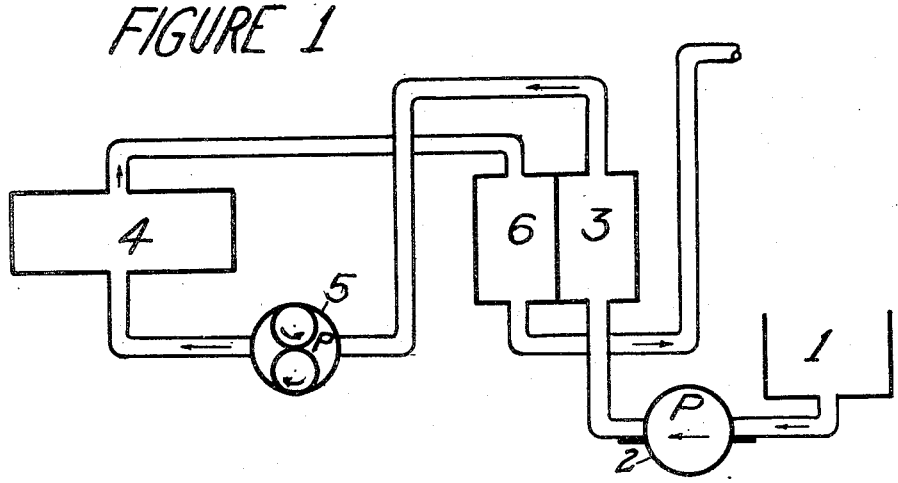
Figure 1 shows pasteurizing apparatus with pumps as employed in our system.
Figure 2:
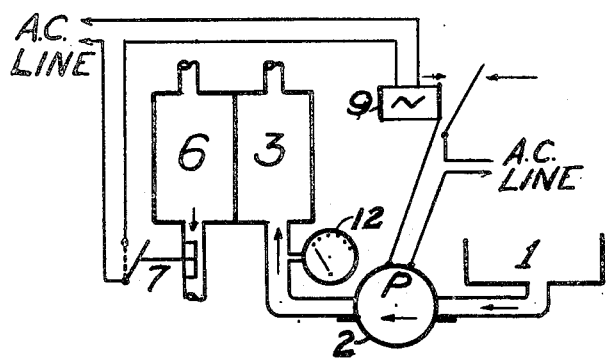
Figure 2 shows one form of pump control.

Our invention (see Figure 1) places an auxiliary pump 2 on the raw side of the system between the inlet to the raw side of the regenerator 3 and the cold raw milk supply 1. The purpose of this auxiliary pump is to reduce or totally eliminate the vacuum or suction on the raw or unpasteurized side of the system. The auxiliary pump will incidentally raise the capacity of the whole system by diminishing the drag on the input side of the main pump 5. The pressure developed on the raw milk side 3 of the regenerator by this auxiliary pump 2 is to be all times less than the pressure developed by the main pump 5 on the pasteurized side 6 of the regenerator. This pressure differential is to be maintained by a controller 7 (see Figure 2) which will automatically cut out the auxiliary pump when the minimum differential is not maintained. In which case, the pressure on the raw milk side of the entire system reverts to subatmospheric pressure by virtue of the action of the positive action main pump, as described in the preceding paragraph. The auxiliary pump is to be started automatically by the controller when the pressure on the pasteurized side of the regenerator gets high enough to meet the minimum differential pressure. It will be seen that the action of the auxiliary pump in delivering raw milk to the inlet of the raw milk side of the regenerator at a pressure equal or greater than normal atmosphere pressure will thereby prevent air from being sucked into the apparatus through leaks and even demonstrate the existence of leaks by dripping during its operation.

Our pressure-differential controlled auxiliary pumping system is useful in the dairy industry in the following applications, 1. Milk to milk heat regenerators with both sides closed to the atmosphere used in connection with the long holding method of pasteurization, e. g. thirty minutes holding time at 142–144 degrees Fahrenheit.

2. Milk to milk heat regenerators with both sides closed to the atmosphere used in connection with the high temperature, short time method of pasteurization, e. g. fifteen seconds holding time at 160 degrees Fahrenheit.

The above mentioned regenerators are used in pasteurization methods for the preheating of the cold raw product and the precooling of the hot pasteurized product. Dairy products pasteurized in the above methods include whole milk, cream, skimmed milk, and other liquid dairy products. We do not desire to limit the scope of our invention to any one particular dairy product.

Figure 3:
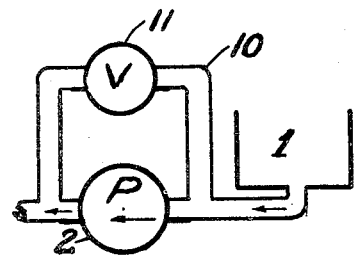
Figure 3 shows a modified auxiliary pump.

Inasmuch as the main pump 5 is a positive action pump, the auxiliary pump must have some provision for liquid to be passed around it or carried through it during the operation of the main pump and stoppage of the auxiliary pump, e. g. at the beginning of a run. The auxiliary pump 2 may be a positive action pump or a centrifugal pump. If it is a positive action pump, it should be placed in the line with a by-pass 10 (see Figure 3) around it. It is well for the by-pass to have an adjustable valve 11 in order to effect a close control over the pressure. If the auxiliary pump is of the centrifugal variety, a by-pass is unnecessary since the inherent design of this pump permits slippage through the impeller. However, a by-pass is helpful in controlling the pressure delivered by a centrifugal pump.

The most advantageous points for pressure measurement and control of the pressure differential are found at the point of entrance of the raw milk into the raw side 3 of the regenerator (all other points in the raw side of the regenerator will therefore be at a lower pressure) and the exit of the pasteurized side 6 of the regenerator (all other points on the pasteurized side of the regenerator will therefore be at a higher pressure). In some instances, it may be necessary to place a flow retarder in the outlet of the pasteurized side of the regenerator in order to obtain a higher pressure therein.

A specific example of a mechanism for our pressure-differential controlled auxiliary pumping system is as follows. A controller consisting of a pressure gauge 7 with electrical contacts is placed at the outlet of the pasteurized side of the regenerator. Let us assume then the main pump delivers fifteen pounds pressure at this point during normal operation. The electrical contacts are set to complete a circuit at fourteen pounds pressure, i. e. at least one pound less than the pressure which the main pump delivers. The completed circuit actuates a relay 9 which starts the auxiliary pump 2. If the main pump pressure, when measured at the aforementioned point, falls below this fourteen pounds, the circuit would be broken and the auxiliary pump would stop. An ordinary pressure gauge 12 is placed at the inlet of the raw side of the regenerator. The auxiliary pump is then set to operate so as to deliver a pressure at this point of at least two pounds less than the normal pressure (e. g. fifteen pounds) delivered by the main pump to the exit of the pasteurized side of the regenerator. The pressure of the auxiliary pump may be adjusted in several ways, (1) a variable speed controlled motor or pump can be used, (2) a valve can be placed before or after the auxiliary pump, (3) a by-pass can be placed around the auxiliary pump, (4) a by-pass with adjustable valve can be placed around the auxiliary pump, (5) if a centrifugal pump is used, the impeller may be shaved down to provide greater slippage, or other methods can be devised. As stated previously, if a positive type mechanism auxiliary pump is chosen, it is necessary for a by-pass to be used. If a centrifugal type mechanism auxiliary pump is used, the by-pass is not a necessity but it will provide better control.

Figure 4:
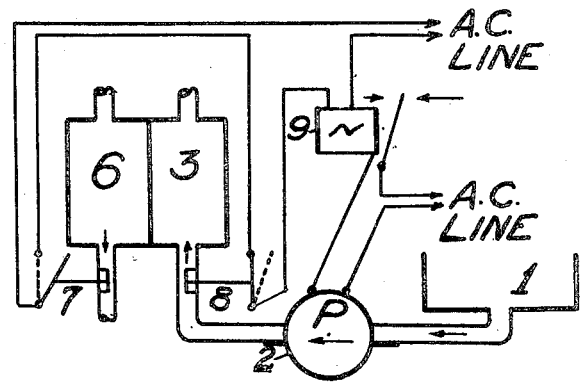
Figure 4 shows a preferred form of pump control.

A further refinement of the above example might include a pressure gauge with limit switch 8 (see Figure 4) installed at the inlet of the raw side 3 of the regenerator. The limit switch would be in the same electrical relay circuit as above mentioned. Its normal position would be to make contact but it would be set to break contact if the pressure at this point went above the desired pressure in order to give double assurance that the pressure on the pasteurized side of the regenerator would always be greater than the pressure on the raw side.

A somewhat more complicated but similar relay system can be devised to start and stop the auxiliary pump at a specific number of pounds pressure below that delivered by the main pump, when the pressures are measured at the aforementioned points. In such an arrangement, let us suppose the main pump normally delivers fifteen pounds pressure. We could then adjust the relays to start the auxiliary pump when the main pump pressure reached five pounds and to continue the operation of the auxiliary pump as long as a minimum of two pounds pressure differential existed. Even when the main pump's delivered pressure fell somewhat below fifteen pounds due to wear, etc., the auxiliary pump would continue to operate and be controlled by the aforementioned pressure differential.

The working pressures as above mentioned are mere examples and are not intended to limit the scope of this invention, since an innumerable number of other pressure combinations will also work satisfactorily. There are numerous other electrical and mechanical hookups which can accomplish the desired pressure-differential control over our auxiliary pumping system, all of which we desire to come within the scope of our invention.

We claim:

A pressure-differential controlled auxiliary pumping apparatus for use with pasteurizing units with milk-to-milk heat regenerators with both sides closed to the atmosphere wherein a pressure limit switch with normally open electrical contacts is installed at the outlet end of the pasteurized milk side of the heat regenerator for the purpose of completing an electrical circuit which starts the auxiliary pump placed between the raw milk supply and the raw milk inlet to the heat regenerator when the pressure, delivered by the main pump, on this limit switch rises to any desired minimum above atmospheric pressure, the main pump being connected between the outlet end of the raw milk side of the regenerator and the inlet side of the pasteurizer, and this limit switch is wired in electrical series with a second pressure limit switch with normally closed electrical contacts set to open at any desired amount of pressure over atmospheric pressure but less than that pressure at which the first pressure limit switch is set to close, which second pressure limit switch is installed at the inlet of the raw milk side of the heat regenerator for the purpose of breaking the electrical circuit and thereby stopping the auxiliary pump if the pressure on this second limit switch rises above a point wherein the minimum pressure differential established between the settings of the two pressure limit switches no longer exists.

RALPH H. STEINBERG.
HARRY COHEN.

REFERENCES CITED

The following references are of record in the file of this patent:

UNITED STATES PATENTS

| Number | Name | Date |
|---|---|---|
| 2,159,110 | Swarr | May 23, 1939 |
| 2,392,021 | Wildermuth | Jan. 1, 1946 |